3,786,073
SEPARATION PROCESS
Walter Frey, Muttenz, Basel-Land, and Istvan Toth, Basel, Switzerland, assignors to Sandoz Ltd., Basel, Switzerland
No Drawing. Filed Aug. 10, 1971, Ser. No. 170,615
Claims priority, application Switzerland, Aug. 24, 1970, 12,610/70
Int. Cl. C09b 1/00
U.S. Cl. 260—369                         6 Claims

ABSTRACT OF THE DISCLOSURE

Solid anthraquinone nitration products suspended in the nitration medium consisting mainly of nitric acid and phosphoric and/or sulphuric acid are flushed out by an organic flushing agent which is insoluble or sparingly soluble in the mother liquor has a lower specific gravity than the mother liquor and exercises wetting action upon the nitration products; by this process very pure 1-nitroanthraquinone can be obtained.

---

In the nitration of anthraquinone with nitric acid in the presence of sulphuric acid and/or phosphoric acid, suspensions are formed which are difficult to separate. The composition of the solid phase is different from that of the organic substance dissolved in the liquid phase, and depends greatly on the nitration conditions. Nitration can be controlled, especially when working in the presence of phosphoric acid, so that the solid phase consists almost entirely of 1-nitroanthraquinone while the non-nitrated anthraquinone and the other nitration products of the anthraquinone are predominantly present in solution in the mother liquor, along with a small amount of 1-nitroanthraquinone.

The suspensions thus obtained are very difficult to separate because of their poor filterability. Up to now, the technical method used to isolate the nitration products has consisted in diluting the whole reaction mixture (the solid and liquid phases) adding water in such ample volume that very nearly all the organic substance is precipitated. After filtration, a very complex mixture of nitroanthraquinone compounds of the most varied type is obtained, together with some unchanged anthraquinone. The dilute nitration solution is discarded, which represents a serious loss of valuable substances.

It has now been found that the solid products present in the suspension which is obtained by nitrating anthraquinone with nitric acid in the presence of phosphoric and/or sulphuric acid can be separated from the liquid phase, without dilution of the mother liquor, by adding an agent causing flushing of the solid constituents, after which the flushed suspension may be separated by one of the standard methods into the solid and liquid phases or may be employed directly for further reactions, e.g., reduction.

This invention therefore relates to a process for the separation from the mother liquor of the undissolved nitration products obtained by the nitration of anthraquinone with nitric acid in the presence of phosphoric and/or sulphuric acid. The process is characterized by flushing out of the nitration products suspended in the mother lye by means of an organic agent which is insoluble or sparingly soluble in the mother liquor, has a lower specific gravity than the liquor, and exercises wetting action upon the suspended nitration products.

Flushing is carried out by mixing the reaction mixture with the above flushing agent and separating the suspension of nitration products in the flushing agent (="flushed suspension") from the flushed mother liquor.

Depending on the nitration process, the nitration mixture consists mainly of nitric acid, phosphoric acid and/or sulphuric acid (or oleum or one of the sulphates or sulphonates commonly used for this purpose), together with mononitro- and dinitroanthraquinone and small amounts of by-products. The mixture contains a more or less substantial amount of 1-nitroanthraquinone depending on the nitration conditions. The process of this invention is employed preferably for separating α-nitroanthraquinone from other nitroanthraquinones, notably β-nitroanthraquinone and/or unchanged anthraquinone, especially when nitration is carried out with nitric acid in the presence of phosphoric acid as described in Belgian Pat. 761,865.

Any organic agent which is of lower specific gravity than the nitration mixture in which it is employed, which does not react with the constituents of the nitration mixture under the flushing conditions and which is insoluble or only very slightly in the nitration medium is suitable for use as flushing agent. Further, the flushing agent must wet out the nitration products suspended in the nitration medium, preferably to a significantly greater extent than the nitration medium itself. Very suitable agents are halogenated alkanes, such as mono- and poly-chloralkanes, preferably chloroform, mono-, di-, tri- and tetrachlorethanes, and cyclohexyl chlorides, of which 1,2-dichlorethane is used with special advantage.

The suspension of nitration products can be treated as it is obtained on completion of the nitration of anthraquinone, or in the form of the moist filtercake after it has been decanted or filtered.

The flushed suspension contains α-nitroanthraquinone, partly in suspension and partly in solution, minor amounts of other reaction products, some unchanged anthraquinone, a small proportion of nitric acid and occasionally residual traces of phosphoric or sulphuric acid. The remaining organic constituents (along with α-nitroanthraquinone are predominantly β-nitroanthraquinone and unreacted athraquinone) present in the mother liquor after flushing are extracted with an organic solvent. The mother liquor is recovered by separation, e.g. in a separating funnel, strengthened as required with nitric acid, phosphoric anhydride or sulphur trioxide, and used again for further nitration reactions.

The suspension obtained by this flushing process can be separated by filtration into a solid residue consisting of nitroanthraquinones with a high proportion of 1-nitroanthraquinone and a solution containing, besides 1-mononitroanthraquinone, an amount of α,α'-dinitroanthraquinone greater than that in the solid residue. From this solution the mixture of nitrated products can, if desired, be isolated wholly or partly in solid form by evaporation. But it is more advantageous to return the solution for the next flushing operation without recovering all the nitration products, as in this way the proportion of solids in the flushed suspension can be increased.

If an agent is used in which one or more constituents of the mother liquor are partially soluble, it is of advantage for the agent to be saturated with these constituents before use. The best course, in fact, is to use the selected flushing agent several times over. If pure 1,2-dichlorethane is chosen, it carries off a certain amount of the nitric acid in dissolved form and only attains its optimum flushing action when used for the second or third time.

A preferred mode of operation of the process is in the use of the same solvent in the cold for flushing and subsequently with heating for extraction. Flushing is best carried out in the temperature range of 0–40° C., or preferably at room temperature, while extraction can be carried out at temperatures 0° C. to 2–5° C. below the boiling point of the flushing agent, or preferably at room temperature or at 40–60° C. Temperatures at which the flushing agent is likely to be attacked by the nitration mixture are ruled out.

The process of this invention is particularly suitable for separating 1-nitroanthraquinone from the nitration mixture, an operation which yields pure α-nitroanthraquinone even after 100% nitration. A great advantage of the process is that the mother liquor can be used repeatedly as nitrating medium, following extraction and strengthening as necessary with nitric acid and phosphoric anhydride.

The 1-nitroanthraquinone compound, from which 1-aminoanthathraquinone can be obtained by the known route, is a valuable intermediate for the production of anthraquinone dyes, a class which is constantly growing in importance on account of their brilliance of shade and high color fastness. For this purpose, the fact that the 1-nitroanthraquinone formed by nitration of anthraquinone can be isolated in the pure state by the present process is of special value.

In the following example the parts and percentages are by weight and the temperatures in degree centigrade.

The apparatus used for flushing consists of a cylindrical vessel fitted with a stirrer, into which the flushing agent is conducted through a pipe at the base while the suspension resp. solution formed by flushing is led off through an overflow pipe at the top.

EXAMPLE

In the course of 10–30 minutes 186 parts of 98% nitric acid are added to a mixture of 104 parts of anthraquinone and 1090 parts of 100% phosphoric acid. The mixture is reacted for 17 hours at 45°. At 20° with slow stirring, 2000 parts of 1,2-dichlorethane are gradually added in 30 minutes as flushing agent. The flushed suspension is filtered to give 67 parts of a dry product consisting of 92% α-nitroanthraquinone and 8% α,α-dinitroanthraquinone. By evaporation of the filtrate, a further 55 parts of dry substance are obtained which contains 60% α-nitroanthraquinone. The liquid remaining in the flushing vessel consists of a 98–99% phosphoric acid containing 5–10% nitric acid. It is extracted with 2000 parts of 1,2-dichlorethane at 20° and the extracted solution evaporated to dryness, whereupon 16 parts of a residue are obtained which consists of 50% α-nitroanthraquinone, 40% β-nitroanthraquinone and 10% α,α'- and α,β'-dinitroanthraquinones. The extracted phosphoric acid, after the addition of phosphorus pentoxide and nitric acid, is used again for nitration.

Having thus disclosed the invention what we claim is:

1. In a process wherein a poorly filterable reaction mixture formed by the nitration of anthraquinone with nitric acid in the presence of phosphoric and/or sulfuric acid and comprising solid anthraquinone-nitration products suspended in a liquid reaction medium is treated to effect separation of said solid products from said liquid reaction medium, the improvement which comprises mixing said reaction mixture with inert organic flushing means to produce a second suspension comprising said solid products in said flushing means and separating said second suspension from said liquid reaction medium; said flushing means (a) being insoluble or sparingly soluble in said liquid reaction medium, (b) having a lower specific gravity than that of the liquid reaction medium, (c) wetting said suspended nitration products to a greater extent than the reaction medium wets said nitration products, and (d) being a halogenated alkane.

2. A process according to claim 1 which includes the subsequent step of extracting from the liquid reaction medium nitration products dissolved therein.

3. A process according to claim 2 wherein the flushing is effected at a temperature of 0° to 40° C. and the extraction is effected with the organic flushing means and at a temperature of 0° C. up to 2° below the boiling point of said flushing means.

4. A process according to claim 2 wherein mixing the reaction mixture with organic flushing means is effected in the cold, and the extracting is effected with heating and with the organic flushing means.

5. A process according to claim 1 wherein the halogenated alkane is a chlorinated alkane.

6. A process according to claim 5 wherein the chlorinated alkane is 1,2-dichlorethane.

References Cited

Lubs: The Chemistry of Synthetic Dyes and Pigments, pp. 350–351 (1955).

LORRAINE A. WEINBERGER, Primary Examiner

E. J. SKELLY, Assistant Examiner